United States Patent
Rodriguez et al.

(10) Patent No.: US 9,912,135 B2
(45) Date of Patent: Mar. 6, 2018

(54) CROSS ARM COVERS FOR UTILITY POLES AND RELATED METHODS

(71) Applicant: SAN DIEGO GAS & ELECTRIC COMPANY, San Diego, CA (US)

(72) Inventors: Daniel P. Rodriguez, Carlsbad, CA (US); Gideon Lichlyter, Escondido, CA (US)

(73) Assignee: San Diego Gas & Electric Company, San Diego, CA (US)

( * ) Notice: Subject to any disclaimer, the term of this patent is extended or adjusted under 35 U.S.C. 154(b) by 792 days.

(21) Appl. No.: 14/488,116

(22) Filed: Sep. 16, 2014

(65) Prior Publication Data

US 2015/0075859 A1    Mar. 19, 2015

Related U.S. Application Data

(60) Provisional application No. 61/879,037, filed on Sep. 17, 2013.

(51) Int. Cl.
*H02G 7/20* (2006.01)
*H02G 7/00* (2006.01)

(52) U.S. Cl.
CPC ................ *H02G 7/00* (2013.01); *H02G 7/20* (2013.01)

(58) Field of Classification Search
CPC .. H02G 7/00; H02G 7/20; H02G 7/02; H02G 7/04; H02G 7/05; H02G 7/205; H02G 7/053; H02B 1/14; F16M 2200/00; F16M 13/02
USPC ......... 174/5 R, 40 R, 45 R, 138 F, 168, 174, 174/146; 52/40, 697, 220.1, 220.7, 52/220.8; 248/49, 68.1
See application file for complete search history.

(56) References Cited

U.S. PATENT DOCUMENTS

| | | | | |
|---|---|---|---|---|
| 4,025,824 A | * | 5/1977 | Cheatham | H02B 5/02 174/45 R |
| 4,234,753 A | * | 11/1980 | Clutter | H02G 7/00 174/136 |
| 6,347,488 B1 | * | 2/2002 | Koye | E04H 12/24 174/146 |
| 9,702,162 B2 | * | 7/2017 | Ceko | E04H 12/24 |
| 9,784,408 B2 | * | 10/2017 | Bennett | H02G 7/00 |

* cited by examiner

*Primary Examiner* — Angel R Estrada
(74) *Attorney, Agent, or Firm* — Klein, O'Neill & Singh, LLP

(57) ABSTRACT

Rigid non-conducting safety covers for the conductive components on an electrical utility pole are disclosed. The safety covers prevent arcing or current flowing to a user working on a utility pole. The safety covers extend over portions of the utility pole, cross arm and bracket mounting the cross arm to the utility pole.

21 Claims, 13 Drawing Sheets

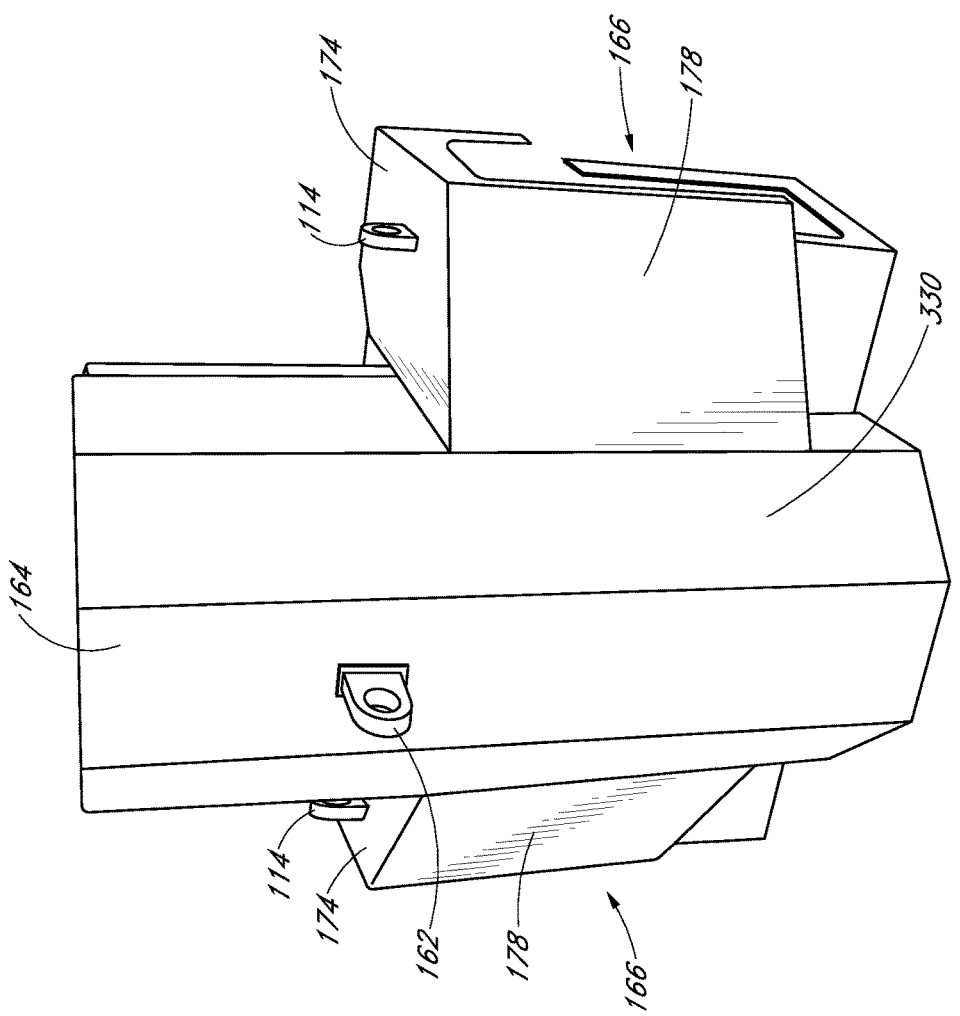

CROSS ARM COVERS FOR UTILITY POLES AND RELATED METHODS

FIELD OF ART

The present invention generally relates to safety devices. More particularly, systems, devices, and methods are disclosed that relate to safety devices and to safety devices for use with utility poles for the distribution of energy. In particular, systems, devices, and methods are disclosed that relate to an insulated barrier to prevent incidental contact with cross arms on utility poles, such as steel utility poles, and hardware that may be live while performing various utility related tasks on utility poles.

BACKGROUND

The use of steel utility poles has been drastically increased due to the threat of fire in rural areas of various states and counties as well the desire to generally reduce the use of wooden poles. With steel poles comes a safety issue for electrical workers due to the ground path created by the metal pole in close proximity to the conductors.

In an attempt to isolate the workers when working on steel poles, rubber blankets have been used to cover and insulate the working area that electrical workers might contact. However, rubber blankets are cumbersome to handle, difficult to install, and can easily damage by the cross arm hardware. Damaged blankets are both expensive and create a false sense of security for the electrical workers while engaged in the steel-pole-related activities.

SUMMARY

Steel pole cross arm covers in accordance with aspects of the present devices, systems, and methods are disclosed for use on steel poles to provide an insulated barrier between the utility worker and live wires and components covered by the cross arm cover to prevent incidental contact therewith by the worker.

A safety cover for use with a utility pole comprising: a housing having a plurality of panels forming a first vertical channel and a second horizontal channel intersecting one another at an intersection; a first end opening into the second horizontal channel and a second end opening into the second horizontal channel located opposite the first end opening; the first and second end openings being sufficiently large to accommodate a cross-arm of a utility pole and the vertical channel being sufficiently large to surround at least part of a circumference of a utility pole; and wherein the housing is made of a rigid non-conducting material to electrically isolate electrical components covered by the housing.

The safety cover wherein the housing can comprise a first housing piece and can further comprising a second housing piece comprising a plurality of panels defining a horizontal channel.

The safety cover wherein the first and second housing pieces can overlap on at least two surfaces.

The safety cover can further comprise a slot in the housing for accommodating a support cable.

The safety cover can further comprise a hood formed with the housing.

The safety cover wherein at least one of the overlaps can occur between two vertical surfaces.

The safety cover wherein at least one of the overlaps can occur between two horizontal surfaces.

The safety cover can further comprise eyelets passing through slots to retain the first and second housing pieces together.

The safety cover can further comprise locking pins made of a non-conducting material engaging the eyelets.

The safety cover can further comprise a spacer sized and shaped to fit within the horizontal channel and wherein the spacer can comprise a cut-out.

A safety cover for use with a utility pole comprising: a first housing piece comprising an upper section and a lower section, which is wider than the upper section; the upper section comprising a plurality of panels defining a vertical channel for accommodating an elongated body of a utility pole and the lower section comprising a plurality of panels defining a horizontal channel for accommodating a crossbar; a first side panel and a second side panel each comprising a cut-out defining an opening to the horizontal channel; a second housing piece comprising an upper section and a lower section, which is wider than the upper section; the upper section comprising a plurality of panels defining a vertical channel for accommodating an elongated body of a utility pole and the lower section comprising a plurality of panels defining engaging arms for engaging the lower section of the first housing piece; at least one eyelet located inside a slot for securing the first housing piece to the second housing piece; and wherein both the first and second housing pieces are made from a rigid non-conducting material to electrically isolate electrical components covered by the first and second housing pieces.

The safety cover wherein the engaging arms of the second housing piece can rest on a top panel of the first housing piece.

The safety cover wherein the first and second housing pieces can overlap on at least two surfaces.

The safety cover can further comprise a slot in the first housing piece having a support cable passing therethrough.

The safety cover can further comprise a hood formed with the first housing piece.

The safety cover can further comprise a spacer sized and shaped to fit within the horizontal channel of the first housing piece and wherein the spacer can comprise a cut-out.

The safety cover can further comprise locking pins made of a non-conducting material that engage the eyelet.

A method for mounting a safety cover to a utility pole comprising: providing a first housing piece made of a non-conducting material, said first housing piece comprising: a plurality of panels defining a first channel sized and shaped to cover a cross arm of the utility pole; a plurality of panels defining a second channel perpendicular to the first channel for covering at least part of a circumference of an elongated body of the utility pole; placing the first housing piece onto the cross arm so that the cross arm is located at least in part inside the first channel; and lowering the first housing piece so that the cross arm comes to rest in the first channel; and wherein when the first housing piece comes to rest in the first channel, the first housing piece covers a bracket that connects the cross arm to the elongated body of the utility pole.

The method can further comprise placing a second housing piece into engagement with the first housing piece.

BRIEF DESCRIPTION OF THE DRAWINGS

These and other features and advantages of the present devices, systems, and methods will become appreciated as the same become better understood with reference to the specification, claims and appended drawings wherein:

FIG. 8 shows the second housing piece of FIG. 7 from another perspective.

DETAILED DESCRIPTION

The detailed description set forth below in connection with the appended drawings is intended as a description of the presently preferred embodiments of safety covers provided in accordance with aspects of the present devices, systems, and methods and is not intended to represent the only forms in which the present devices, systems, and methods may be constructed or utilized. The description sets forth the features and the steps for constructing and using the embodiments of the present devices, systems, and methods in connection with the illustrated embodiments. It is to be understood, however, that the same or equivalent functions and structures may be accomplished by different embodiments that are also intended to be encompassed within the spirit and scope of the present disclosure. As denoted elsewhere herein, like element numbers are intended to indicate like or similar elements or features.

As used herein, the terms first, second, front, rear, vertical, and horizontal are intended to differentiate between different class or category of items only, such as first flange and second flange or upper flange and lower flange, and are not intended to be structurally limiting unless the context indicates otherwise. Devices, systems, and methods of the present disclosure include a non-conducting multi-piece cover which may be installed over a cross arm of a steel utility pole at the attachment point on the utility pole. The cover may be installed using a Hot Stick (known in the industry as an insulated pole, typically made of fiberglass, for use on or around live wires to prevent electrical shock) or the like immediately after the user has strung conductors on a structure for elevating electrical utility lines or wires.

Figure 1:
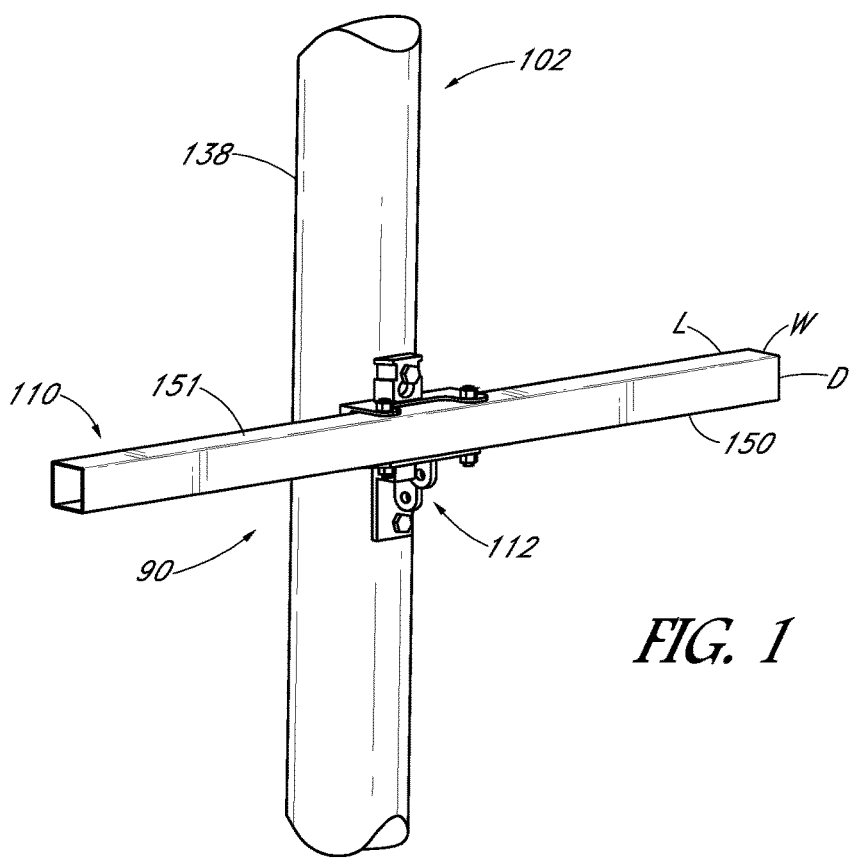
FIG. 1 shows a perspective view of a utility pole with a cross arm, and brackets.

FIG. 1 shows an exemplary utility pole 102. The utility pole 102 comprises an elongated body 138 comprising a pole surface. A cross arm 110 comprising a width W, a depth D, a length L, and multiple sides, including an underside 150 and a top side 151, is mounted on the elongated body using one or more brackets 112. Generally speaking, the bracket 112 attaches the cross arm 110 to the utility pole 102 at a perpendicular position to the elongated body 138. The cross arm 110 and the elongated body 138 define an intersection 90. As further discussed below, the present safety cover is configured to operate with the utility pole 102 having the horizontally arranged cross arm 110 as well as any cross arm that is mounted in other configurations, such as attaching the cross arm 110 at angles up to 45 degrees from perpendicular. The utility pole 102 may be manufactured from treated wood, metal, or a concrete composite. The cross arm 110 may be manufactured from treated wood, metal, or composite material, such as any number of polymers or from fiberglass. The bracket 112 is made from metal but may be manufactured from any material capable of withstanding the loads placed on it by the electrical lines and wind. In some embodiments the cross arm 110 comprises at least two separate sections that are each connected by a separate bracket to the elongated body 138 and extend opposite one another about the cross arm 110, similar to two arms extending from a human body. In other embodiments, cross arms having more than two pieces are contemplated.

Figure 2:
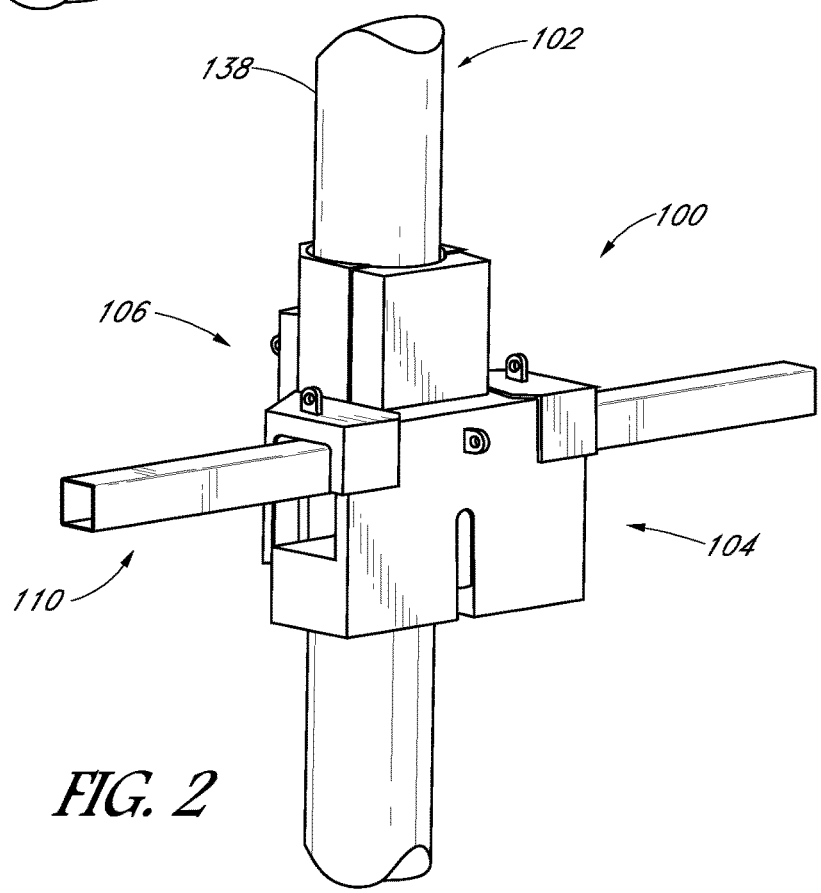
FIG. 2 shows a perspective view of a safety cover provided in accordance with aspects of the present invention mounted onto the utility pole of FIG. 1.
Figure 3:
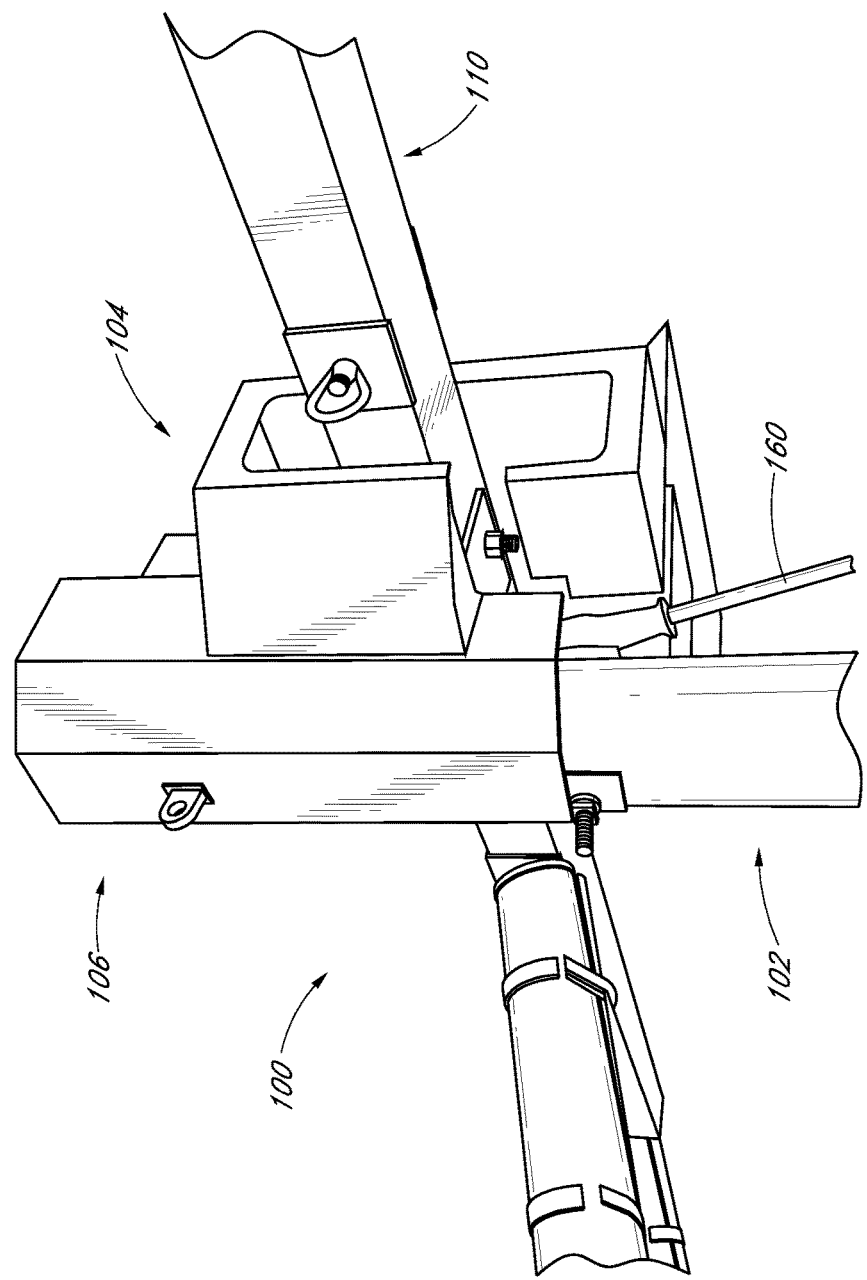
FIG. 3 shows a perspective view of the safety cover of FIG. 2 from a different perspective.

With reference now to FIGS. 2 and 3, an exemplary safety cover 100 provided in accordance with aspects of the present disclosure mounted on a utility pole 102 is shown. The safety cover 100 shown in the present embodiment is a two-piece structure configured to cooperate with one another to isolate that section of the utility pole 102 covered by the safety cover 100 from a worker. In other examples, the safety cover 100 is made from a single piece or from more than two separate pieces that cooperate to isolate the worker from the utility pole 102. As shown, a first housing piece or section 104 is hung to the cross arm 110 and straddles the pole body 138 to cover the intersection between the cross arm 110 and the utility pole 102 as well as to cover the brackets 112 (FIG. 1) that hold the cross arm to the utility pole 102. A support cable 160 (FIG. 3) is shown extending from the bracket 112 (FIG. 1), which supports the pole 102 laterally and may not be used in all cases. Thus, the safety cover 100 is usable with a utility pole 102 that may or may not incorporate one or more support cables.

A second housing piece or section 106 is also shown hung to the utility pole 102 on a side opposite the first housing piece 104. For example, if the utility pole and cross arm are viewed as two different sections, such as a front section and a rear section or a first section and a second section, the first housing piece 104 is configured to cover the front section of the utility pole while the second housing piece 106 is configured to cover the back section, both at the intersection 90 (FIG. 1) between the cross arm 102 and the elongated body 138. The first and second housing sections 104, 106 can overlap at an imaginary boundary separating the first section from the second section. If the utility pole has a circumference C, the second housing piece 106 is designed to wrap around a majority of the circumference C while the first housing piece 104 is configured to cover the remaining section of the circumference C, with or without overlapping between the two sections. In other examples, the two sections cover roughly an equal amount or potion of the circumference C.

Figure 4:
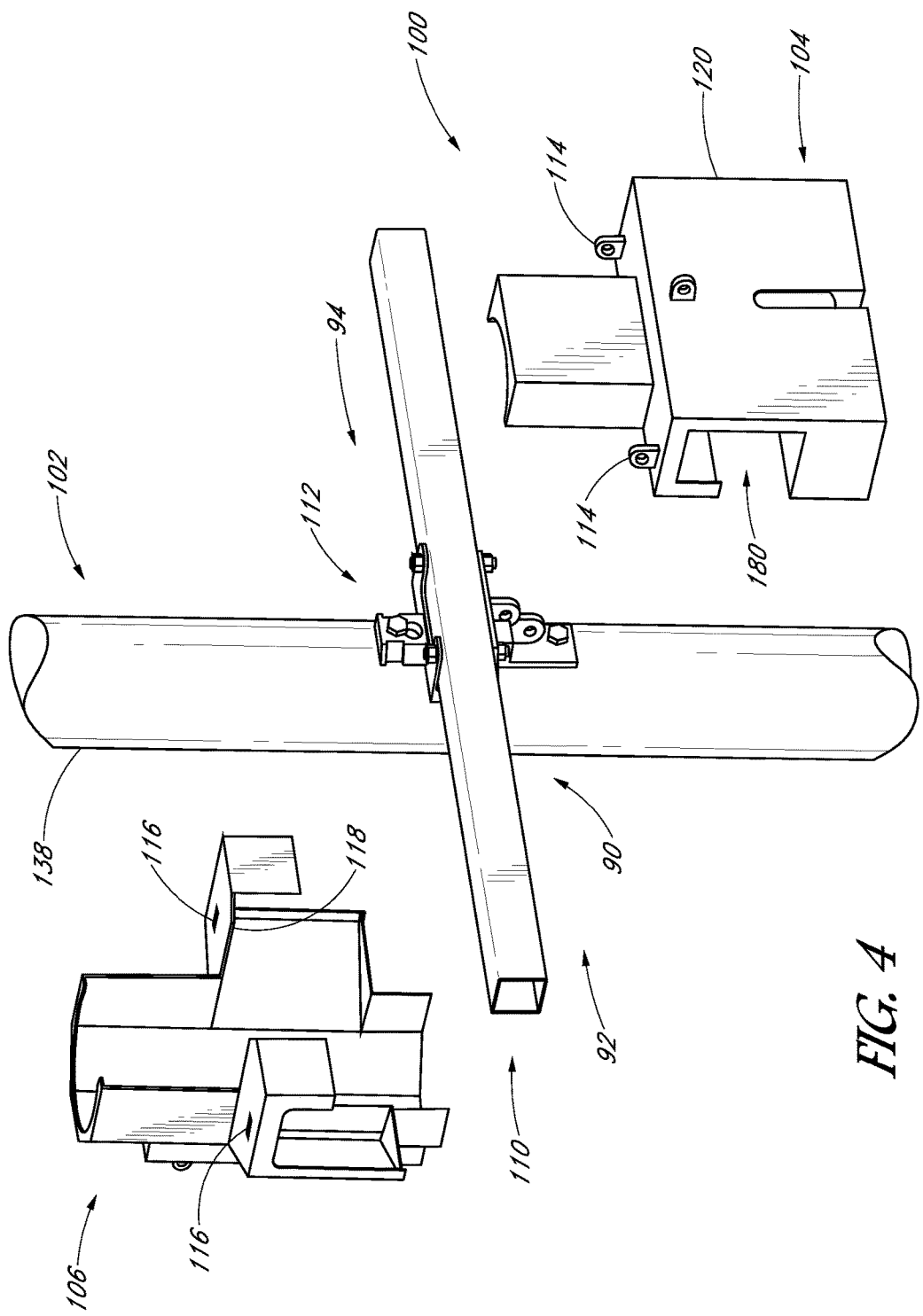
FIG. 4 shows an exploded perspective view of the safety cover about the utility pole to indicate how the components of the safety cover may be assembled.

FIG. 4 shows the safety cover 100 in accordance with aspects of the present disclosure in an exploded view around a utility pole 102 to show the features of the first housing piece 104 and second housing piece 106. The first and second housing pieces 104, 106 are shown oriented around the utility pole in the same general manner for mounting them onto the utility pole to cover the intersection 90 of the utility pole 102. The first housing piece 104 is mounted to the utility pole 102 by first moving the first housing piece over the cross arm 110 so that the cross arm passes through a space 180 provided in the first housing piece and then allowing the first housing piece 104 to be lowered so that portions of the first housing piece overhang both sides of the cross arm and over the intersection 90. Sections of the first housing piece 104 and second housing piece 106 are further discussed below. As shown, the cross arm 110 is hung to one side of the elongated body 138 of the utility pole, which may be referred to as the first side or section 92, and the side opposite the first side without the bracket may be referred to as the second side or section 94.

In some embodiments, the first housing piece 104 has a set of eyelets 114 for use to secure the first housing piece to the second housing piece. In other embodiments, there can be as few as one, and in still others, three or more eyelets 114 may be incorporated. The second housing piece 106 has slots 116 sized and shaped to allow the eyelets 114 to pass through. Thus, the eyelets 114 and the slots 116 cooperate, such as engage, to secure the first and second housing sections 104, 106 together around the cross arm 110 and elongated body 138 at the intersection 90. In other embodiments the placement of the eyelets 114 and slots 116 may be reversed, with the eyelets 114 formed on the second housing piece 106 and the slots 116 formed in the first housing piece 104. Once engaged, the eyelets are sized and shaped to accept locking pins to prevent the two from accidentally separating. The locking pins preferably have tapered surfaces, such as having a cone shape, to facilitate insertion into the eyelets and held there by friction and interference. In an example, the locking pin is a Cotter pin. In other embodiments, the upper portion of the eyelets may be rotatable so that they turn at least 90 degrees over the slots 116 to prevent the separation of the first and second housing pieces. A ratchet system, such gears or teeth, may be incorporated to restrict the rotation of the eyelets and therefore guard against accidental rotation and subsequent separation. The second housing piece 106 is placed against the exterior surface 138 of the utility pole along the second side 94 and then brought into engagement with the first housing piece 104 so that an inner surface portion 118 of the second housing piece rests against an outer surface portion 120 of the first housing piece 104. If the positions of the eyelets 114 and the slots 116 are reversed, then the second housing piece 106, now with the eyelets, would be mounted over the cross arm 110 first and then the first housing piece 104, now with slots, mounted over the second housing piece. In other examples, different securement devices are incorporated to secure the first and second housing pieces 104, 106 together. For example, a strap system, fastening means, belts, ropes, or tape may be used.

Figure 5:
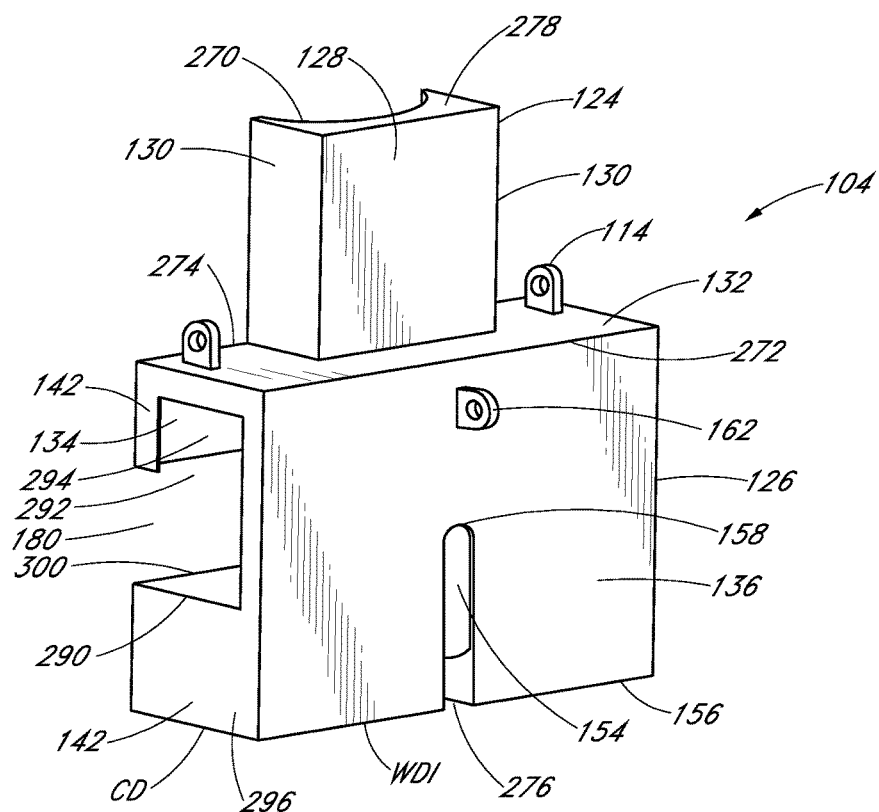
FIG. 5 shows a perspective view of a first housing piece of the safety cover.

FIG. 5 is a close up perspective view of an exemplary first housing piece 104 formed as a unitary structure. For example, the first housing piece 104 may be made from molding, such as blow molding, thermoforming, or injection molding, the structure as a one piece to cover the cross arm at a location where an utility worker performs his tasks, such as the intersection 90 (FIG. 1) between the cross arm and the utility pole. In another example, the first housing section 104 is formed as a multi-piece design, such as from co-molding or over-molding or by attaching two or more separately formed pieces together.

As shown, the first housing piece 104 comprises an upper section 124 and a lower section 126. The upper section 124 comprises a multi panel structure. In one embodiment, the upper section 124 comprises three sides arranged in a "U" shape configuration, with a central side 128 and two sidewalls 130 extending from the edges of the central side 128 to define a holding space 270 therebetween for accommodating the elongated body 138 of the utility pole. The holding space 270 may be considered a vertical channel for accommodating the vertical utility pole. As shown, the upper section 124 is configured to enclose a small arcuate section of the utility pole 102 in the holding space 270. In other examples, the upper section 124 is arcuate and resembles a half or a fraction of a circumference of a cylinder. The arcuate surface may be viewed as a plurality of interconnected panels forming the vertical channel for covering at least part of the utility pole. In another example, the upper section has a plurality of interconnected sides that form a jagged arcuate section.

With reference to FIGS. 1 and 5, the lower section 126 of the first housing piece 104 comprises a top panel 132 having a depth CD that is larger than the depth of the cross arm D and a width WD1 that is greater than the diameter of a typical utility pole. In some examples, the width WD1 is selected to expand across the pole diameter but also part of the cross-arm that extends laterally of the elongated body 138 of the utility pole. The top panel 132 has an outer edge 272, which is also the upper edge for the central panel 136, and an inner edge 274. Inner panels 134 extend downward from the inner edge 274 and are spaced from one another, such as being spaced at the central section wherein the upper section 124 is located for accommodating the elongated body 138. When mounted to a utility pole, the inner panels 134 are placed to either side of the utility pole. Instead of two inner panels, the structure may be viewed as a single inner panel with a space or cut-out to accommodate the elongated pole.

A central panel 136 extends from the outer edge 272 of the top panel 132 and has a width that is generally the same as the width of the top panel 132. The length of the central panel 136 extending downwardly from the top panel 132 such that it extends below the lower edges of the two inner panels 134 a distance sufficient to receive the cross arm 110 in the open space 180 when the first housing piece 104 is placed onto the utility pole and over the cross arm. Thus, a number of panels are provided in the lower section 126 to define a horizontal channel for accommodating a cross arm of a utility pole. The horizontal channel intersects the vertical channel at an intersection. Further, the central panel 136 extends downward so that the central panel can cover a number of optional support structures or components attached to the utility pole 102, the cross arm 110, and/or brackets 112. For example, cross arm supports (not shown) can often attach to the underside 150 of the cross arm 110 and extend from the underside 150 to a point on the exterior surface of the elongated body 138 of the utility pole 102, similar to trusses. The central panel 136 extends sufficiently downward to cover the area where the support components attach to the exterior surface of the elongated body 138. In addition, the central panel 136 has a slot 154 with a first end 276 at or near a bottom edge 156 of the central panel and a second end 158 near a mid-point of the central panel 136, with the slot 154 being roughly centered from left to right on the central panel 136. The slot 154 is sized and shaped to accommodate a support cable 160 (FIG. 3). The support cable attaches to the utility pole 102 either at or just below the bracket 112. The support cable 160 then angles away from the utility pole 102 to a point on the ground some distance away from the utility pole. The slot 154 is incorporated to accommodate the cable but may be omitted when used on utility poles without any support cable. In other examples, the location of the slot is repositioned on the first housing piece to a different location to accommodate a support cable.

In some embodiments, the utility pole 102 has a support cable similar to the support cable 160 shown in FIG. 3, but attached higher on the utility pole 102 just above the cross arm 110. In these embodiments, the upper section 124 can incorporate a slot having an opening formed at the top edge 278 of the upper section 124 to accommodate the portion of the support cable 160 extending away from the utility pole 102. Alternatively to using a slot in the upper section 124, the lower section 126, or both, the upper section, the lower section or both can be provided with an enlarged or bulged section that can accommodate the cable(s) or other obstructions without slots or in combination with slots. In other words, the two sections can incorporate bulged covers over the open slots so that the slots are not opened but nonetheless capable of accommodating the cables.

In one example, the inner panels 134, the top panel 132, and the central outer panel 136 define the open space 180 for receiving the cross bar, without side panels. In the present embodiment, two side panels 142 (only one shown) are provided on either side edges of the central panel 136 with each comprising a cut-out 290 that defines the opening for open space 180. In combination with the inner panels 134, the open space 180 is divided into a receiving space 292 for receiving the cross arm and a holding or mounting space 294 in which the cross arm is located once installed. Thus, a number of panels are provided in the lower section 126 to define a horizontal channel or space 292 for accommodating a cross arm of a utility pole. The horizontal channel intersects the vertical channel at an intersection. The size of the lower side panel section 296 can vary to adjust the size of the receiving space 292 for receiving different sized cross bars. In some examples, a spacer may be used to take up some of the open space 180 so that the safety cover 100 may be used with a smaller sized cross bar. One such spacer is shown with reference to FIG. 14.

With reference again to FIG. 5, two lower inner panels 300 (only one shown) are provided with each extending from a lower side panel section 296. The two lower inner panels 300 are spaced from one another, similar to the upper inner panels 134. As further discussed below, when used with the second housing section 106, parts of the second housing section 106 can rest against the lower inner panels 300. A lower panel (not shown) opposing the top panel 132 may also be provided having cut-out for accommodating the elongated body 138. In yet other examples, the lower side panel sections 296 taper inwardly towards the axis defined by the upper section 124.

The central side 128 of the upper section 124 is shown recessed from the outer edge 272 of the top panel 132. In another example, the central side 128 is placed co-planar with or even with the surface of the lower central panel 136 of the lower section 126. An additional eyelet 162 is shown provided on the surface of the central panel 136. This eyelet 162 may be used to tie a safety line to or to hang a cable onto to raise and lower the first housing section 104. The eyelet 162 may also be used for electrical testing purposes.

In some embodiments, UHMW (Ultra-high-molecular-weight polyethylene) plastic material has been shown to be sufficiently insulating and durable for use as a material for manufacture of the first housing piece 104. In other embodiments, the first housing piece may be made of other non-conducting materials, such as polycarbonate (PC), fiberglass or carbon fiber.

Figure 6:
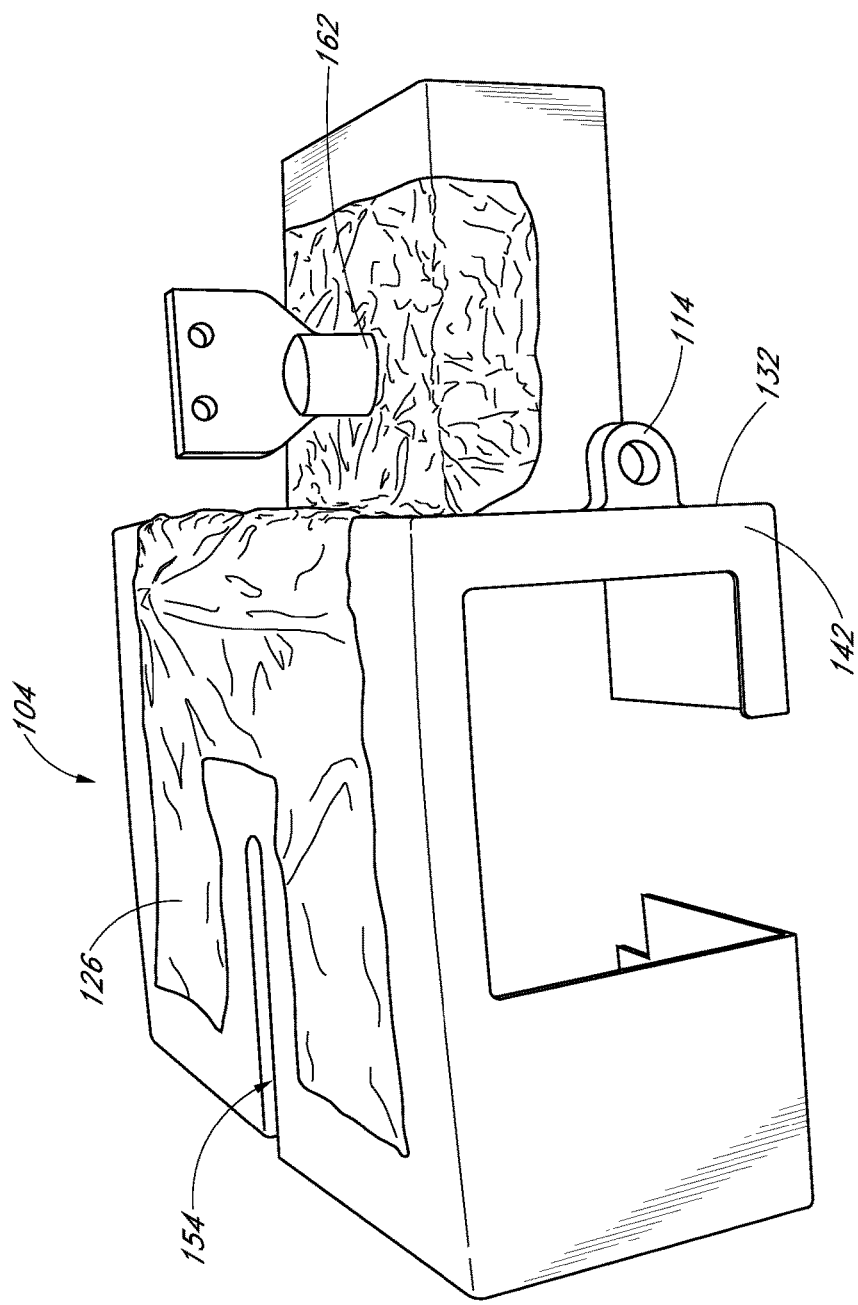
FIG. 6 shows the first housing piece of FIG. 5 from another perspective.

FIG. 6 shows a view of the first housing piece 104 from a side perspective view. Clearly visible are the slot 154, the side panel 142, and the eyelets 114 extending from the top panel 132. In the embodiment shown, a testing eyelet 162 extends from the upper housing section 124. The eyelet 162 may be used for electrical testing purposes, such as to run a current through the first housing piece 104. In other embodiments, the eyelet 162 (FIG. 5) may be located on the lower housing section 126.

Figure 7:
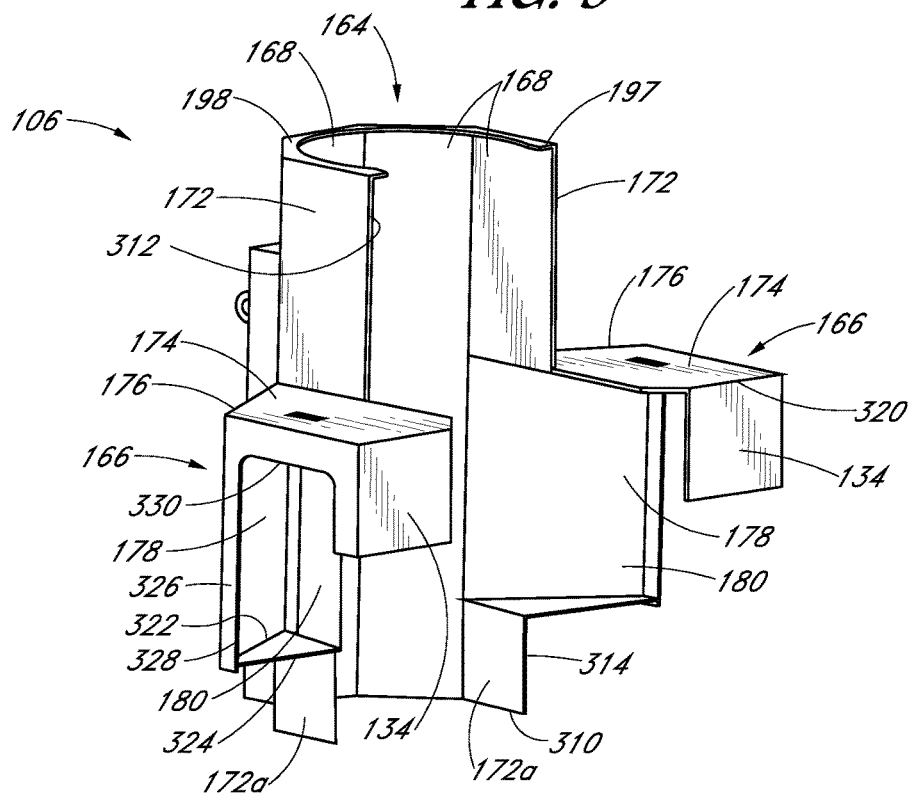
FIG. 7 shows a perspective view of a second housing piece of the safety cover.

With reference now to FIGS. 1, 6, and 7 and initially to FIG. 7, a perspective view of the second housing piece 106 is shown. In the present example, the second housing piece 106 comprises three sections: a central section 164 defining a first vertical channel for accommodating the elongated body of the utility pole, and two side sections 166 defining a horizontal channel. The two side sections overlap the first housing section 104 and can be symmetrical or non-symmetrical about the central section. The central section 164 has wall surfaces or panels 168 that surround some portion of the circumference C of the utility pole 102 such that, in combination with the first housing piece 104, the entire circumference of the utility pole 102 is surrounded. Less preferably, non-obtrusive or sections of the utility pole 102 that are not conducting or conductive may be left exposed. The plurality of panels 168 on the central section 164 are sized and shaped so that they approximate the curvature of the exterior surface of the utility pole 102. The central section 164 has an upper edge 197 and a lower edge 310 at an opposite end and each edge can comprise a lip 198 that can function as a stiffener or rib to reinforce the central section 164, such as to increase the stiffness of the plurality of panels 168. In other embodiments, the central section 164 is molded so that it is smoothly rounded, such as being partially cylindrical, and may or may not include the circumferential lip or flange 198. The overall height of the second housing section 106 is about the same or equal to the overall height of the first housing piece 104. The vertical end edges 312 of the end most panels 172 may also include an inward lip or flange for reinforcement. As further discussed below, when the second housing section 106 is connected to the first housing section 104 around a cross arm on a utility pole, the lower sections 314 of the vertical end edges 312 are configured to contact or abut the lower inner panels 300 of the first housing section.

In some embodiments, the two side sections 166 are unitarily formed with the central section 164. In other embodiments the side sections 166 are separately formed and subsequently attached to the central section 164. The side sections may be joined to the center or central section 164 by mechanical fasters or may be integrated into the material of the center section, which is preferred. The two side sections 166 are attached on the endmost portions of the center section. In the embodiments where the center section 164 comprises multiple panels, the side sections 166 are formed or are integrated with the endmost panels 172 of the center section 164. Depending on the depth or size of the side sections 166, they can be integrated with several of the panels than just the endmost panels 172.

In the embodiment shown, each side section 166 has a shoulder panel 174 that is sized and shaped to overlap with at least part of the rectangular top panel 132 (FIG. 5) of the first housing section 104. The shoulder panel 174 of each second housing section 106 has an inner edge 320 and an inner panel 134 extending downwardly therefrom. The two inner panels 134 overlap portions of the central panel 136 (FIG. 5) of the first housing section when assembled. This overlap configuration helps keep the both housing sections 104, 106 engaged and the utility pole 102, cross arm 110, and bracket 112 covered.

The shoulder panels 174 each has an outer edge 176 and a panel 178 extending therefrom. In one example, the two downward extending panels 178 are angled or tapered in a radial direction towards the lengthwise axis of the second housing section 106. In another example, the two downward panels 178 are not tapered or angled relative to the lengthwise axis. Along the respective lower edge 322 of each downward panel 178, a connecting panel 324 is provided, which connects to the downward panel 178 and to a lower portion 172a of the end most panel 172. When the downward panels 178 are angled or tapered, the connection panels 324 have a three-sided shape.

A side panel 326 is provided that connects to the inner panel 134, the shoulder panel 174, and the downward panel 178. The side panel 326 provides structural rigidity to the three panels that it connects to. The side 326 has a perimeter 328 that defines an open space 180 for sliding the first housing section 106 over the cross arm (FIG. 3). In the example shown, the open space 180 functions as a receiving space and a holding space for the cross arm of the utility pole in that the whole second housing unit 106 can slide directly onto the cross bar and the horizontal edge portion 330 of the side panel 326 comes to rest on the cross bar. In other examples, due to interference, the structures not aligning or by intentionally configuring the second housing as such, the second housing section 106 comes to rest on the cross bar or the first housing section 104 but the horizontal edge 330 of one or both side panels 326 do not touch the cross arm.

In some embodiments, UHMW (Ultra-high-molecular-weight polyethylene) plastic material has been shown to be sufficiently insulating and durable for use as a material for manufacture of the second housing piece 106. In other embodiments, the first housing piece may be made of other non-conducting materials, such as polycarbonate, fiberglass or carbon fiber.

FIG. 8 shows a rear perspective view of the second housing piece 106 of FIG. 7. As shown, the center section 164 has an eyelet 162. This eyelet 162 may be used to tie a safety line to or to hang a cable onto to raise and lower the second housing section 106. The eyelet 162 may also be used for electrical testing purposes, such as to test whether the housing section can electrically isolate current. The present view also shows an alternative placement of two additional eyelets located on the shoulder panel 174 of the two side sections 166 of the second housing section 106. The two eyelets are configured to receive slots 116 located on the first housing section 104. From the present perspective, it is clear that the downward panels 178 on the two side sections 166 are not co-planar with the central outer panel 330 on the central section 164 of the second housing section 106. This arrangement allows the central section 164 to be placed in close proximity to the elongated body 138 of a utility pole and for the downward panels 178, which are located away or inward of the central panel 330, to be in close proximity to a cross arm.

In some examples, the first housing piece 104 is usable as a safety cover 100 to isolate electrical components, such as brackets, terminal ends of live wires, etc., covered by the housing without the need to use the second housing piece 106. A further aspect of the present disclosure is understood to include a method for using the first housing piece 104 by itself without the second housing piece 106.

For other safety covers and cover components disclosed herein below, it is understood that where a feature is shown but not expressly described and is otherwise the same or similar to the feature or features described elsewhere, such as above with reference to FIGS. 2-8, the disclosed part or parts shown in the subsequent drawing figures but not expressly described because of redundancy and because knowledge is built on a foundation laid by earlier disclosures may nonetheless be understood to be described or taught by the same or similar features expressly set forth in the text for the embodiments in which the feature or features are described, such as for the safety cover 100 of FIGS. 4, 5, and 7. Said differently, subsequent disclosures of the present application are built upon the foundation of earlier disclosures unless the context indicates otherwise. The disclosure is therefore understood to teach a person of ordinary skill in the art the disclosed embodiments and the features of the disclosed embodiments without having to repeat similar components and features in all embodiments since a skilled artisan would not disregard similar structural features having just read about them in several preceding paragraphs nor ignore knowledge gained from earlier descriptions set forth in the same specification. As such, the same or similar features shown in the following safety covers incorporate the teachings of earlier embodiments unless the context indicates otherwise. Therefore, it is contemplated that later disclosed embodiments enjoy the benefit of earlier expressly described embodiments, such as features and structures of earlier described embodiments, unless the context indicates otherwise.

Figure 9:
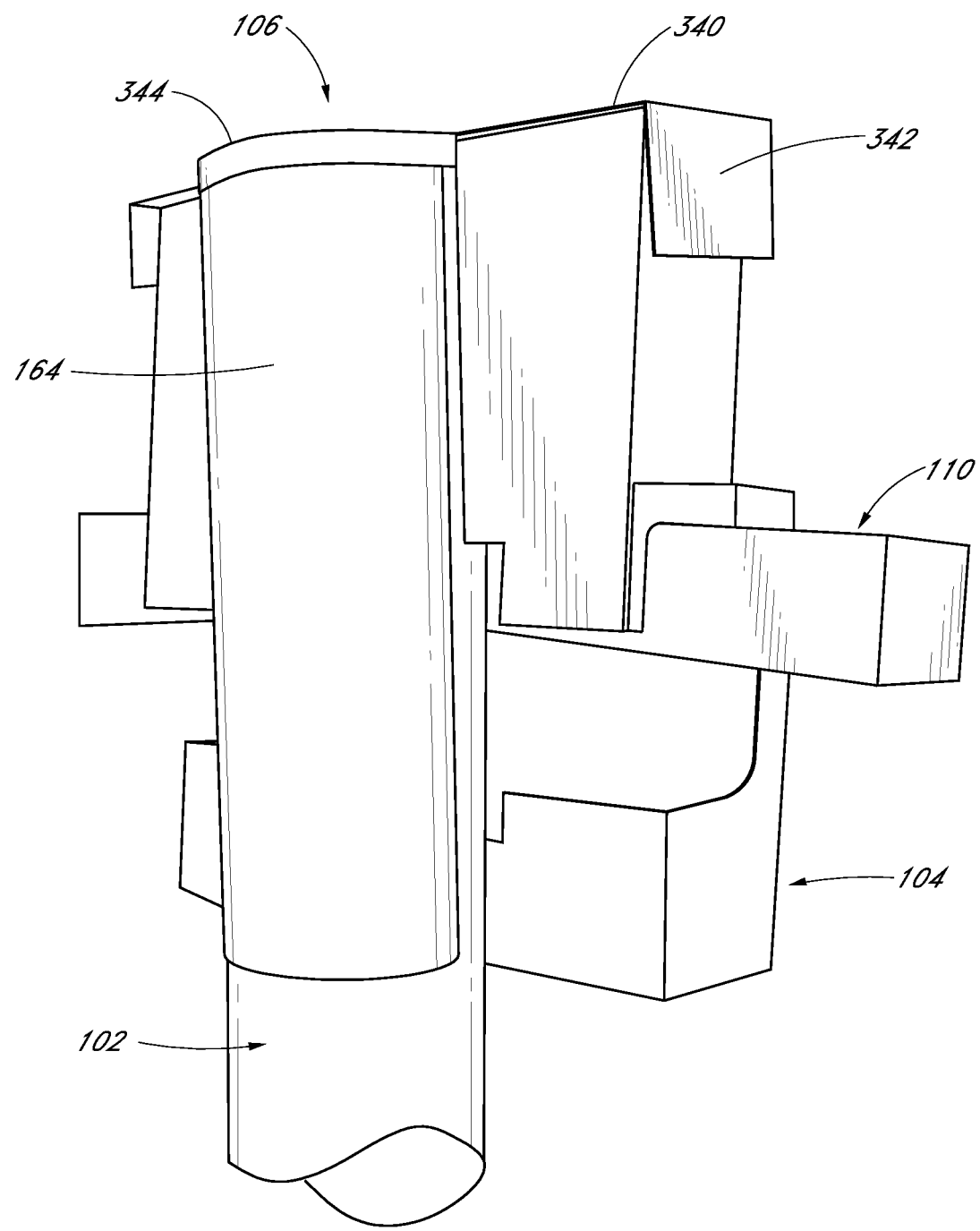
FIG. 9 shows another embodiment of a second housing piece.

FIG. 9 is a perspective view of an alternative embodiment of a second housing section 106 with a rounded central section 164 defining a first vertical channel mounted over the first housing section 104, which has a vertical channel and a horizontal channel that intersect. The alternative second housing section 164 has an upper panel 340 that is generally co-planar with the upper most edge 344 of the central section 164. The upper panel 340 has two downwardly extending side panels 342. Thus, the current second housing section 106 can be positioned onto a first housing section and wherein the location of the upper panel 340 raises the rest point or position of the second housing section 106 relative to the first housing section 104.

Figure 10:
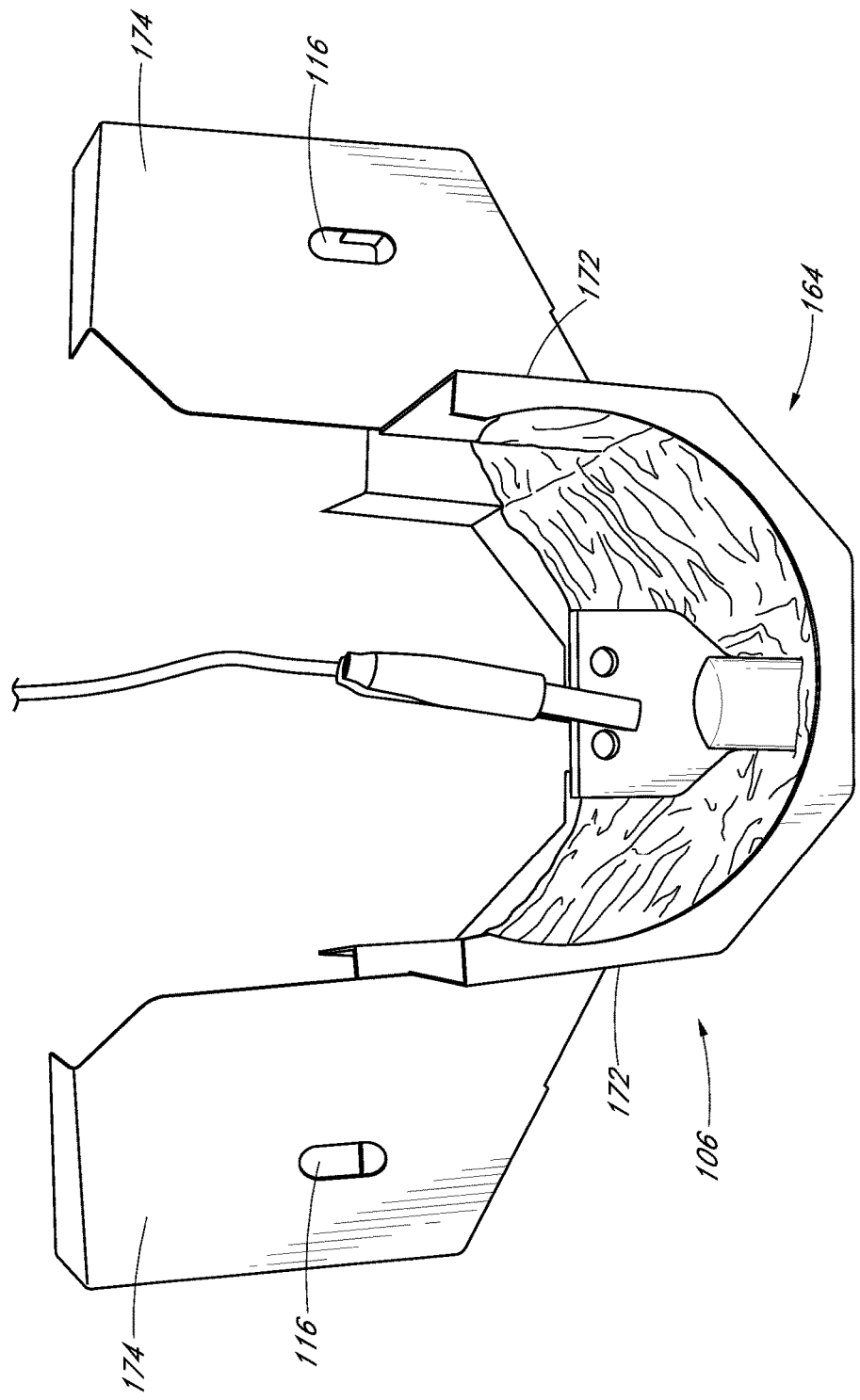
FIG. 10 shows a perspective view of the interior of the second housing piece.

FIG. 10 shows the interior of the second housing piece 106 of FIG. 7, described above. The slots 116 in the shoulder panels 174 are shown. The shoulder panels 174 extend beyond the end panels 172 of the center section 164 in order to overlap the first housing section 104 and extend over the cross arm. In some examples, non-conducting sheet or isolator or a number of such can be placed on the interior surface to further isolate the live wires and components from the utility worker.

Figure 11:
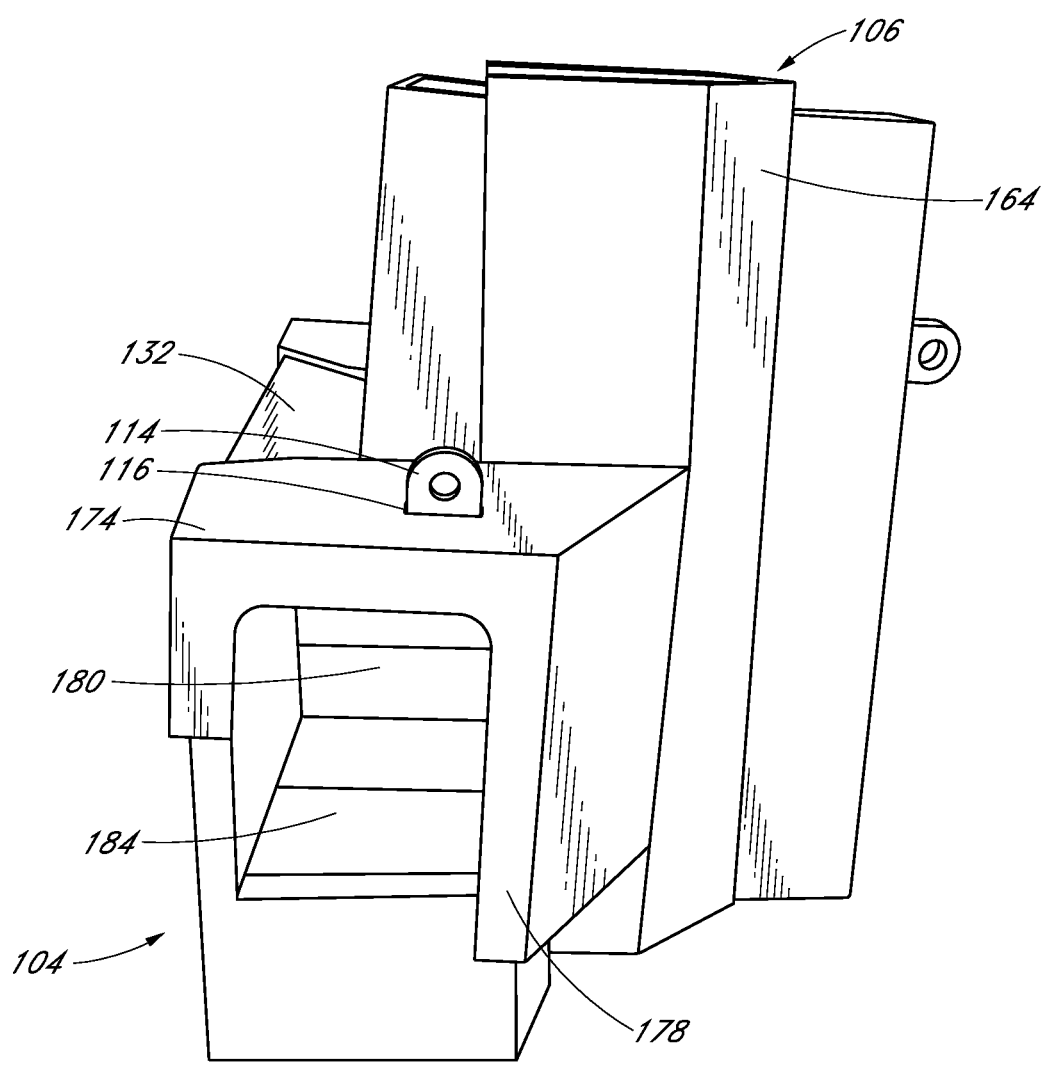
FIG. 11 shows a perspective view of the assembled two housing pieces of the safety cover.

FIG. 11 shows a side view of the safety cover 100 of FIGS. 3 and 4. The eyelets 114 are shown on the top panel 132 of the first housing piece 104 and extend through the slots 116 in the shoulder panels 174 of the second housing piece 106. The space 180 is shown through the safety cover 100 and the side opening 184 is sized to accommodate both heavy and standard cross arms. The side opening 184 has a certain height that can be adjusted by using a spacer, which can be mounted so as to increase the depth D (FIG. FIG. 1) and/or the width W of the cross beam to fit more snuggly within the space 180 and the side opening 184. For example, the safety cover 100 can be used to fit over a heavy cross arm and when needed, fit over a standard cross arm with the aid of a spacer. Alternatively, the safety cover 100 can fit over the standard cross arm without any spacer, which provides for a larger clearance around the cross arm.

Figure 12:
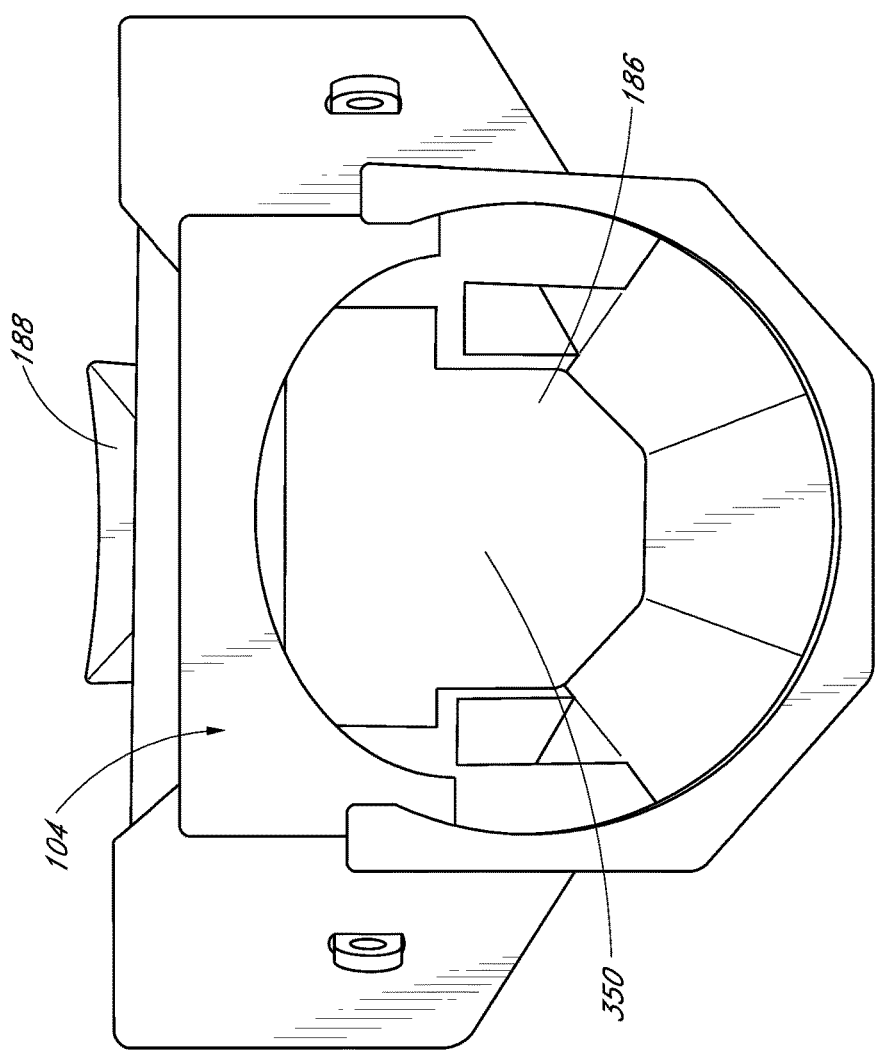
FIG. 12 shows a view of the interior of the assembled two housing pieces of the safety cover.

FIG. 12 is a top view looking down into the interior cavity or space 350 defined by the first housing section 104 and the second housing section 106, such as when the two sections are engaged or connected. Shown is the top opening 186, which is sized and shaped to fit around the exterior surface of the utility pole 102. Further shown in this embodiment is a hood 188, which is formed on the first housing section and is sized and shaped to accommodate a support cable (not shown), which is alternative to an open slot (FIG. 5). The hood 188 performs the same function as the slot 154, which is to provide space to accommodate the support components of the utility pole. The hood provides some additional coverage for the support cable (not shown) length past the point where the slot 154 would provide coverage.

Figure 13:
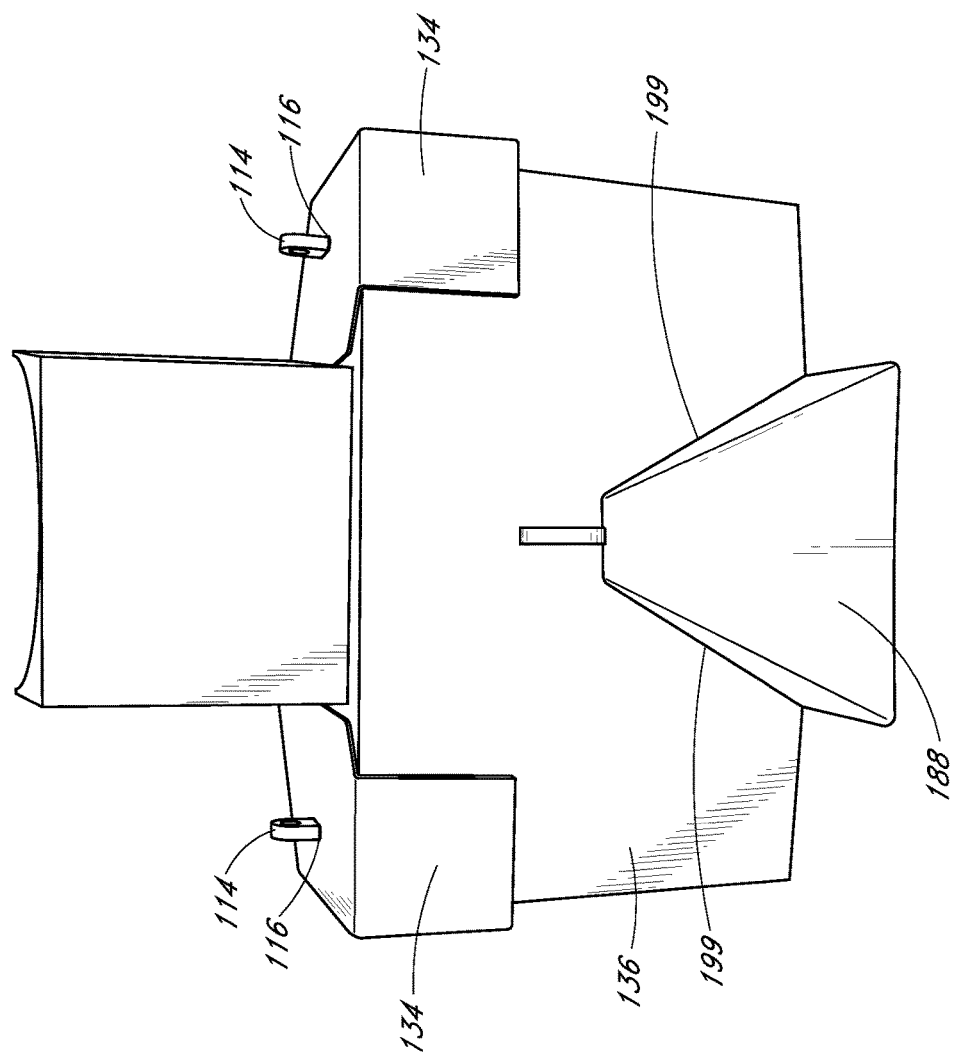
FIG. 13 shows a perspective view of the assembled two housing pieces, including a hood on the first housing piece.

FIG. 13 shows a different view of the embodiment of FIG. 12. The hood 188 projects from the first housing section 104. The hood 188 comprises a partial pyramid shape, with three roughly triangular sides 199. The panels 134 cover a portion of the large central panel 136 on the first housing section, and the eyelets 114 protrude through the slots 116. In other examples, the hood is semi-cylindrical, rectangular, or has other shapes.

Figure 14:
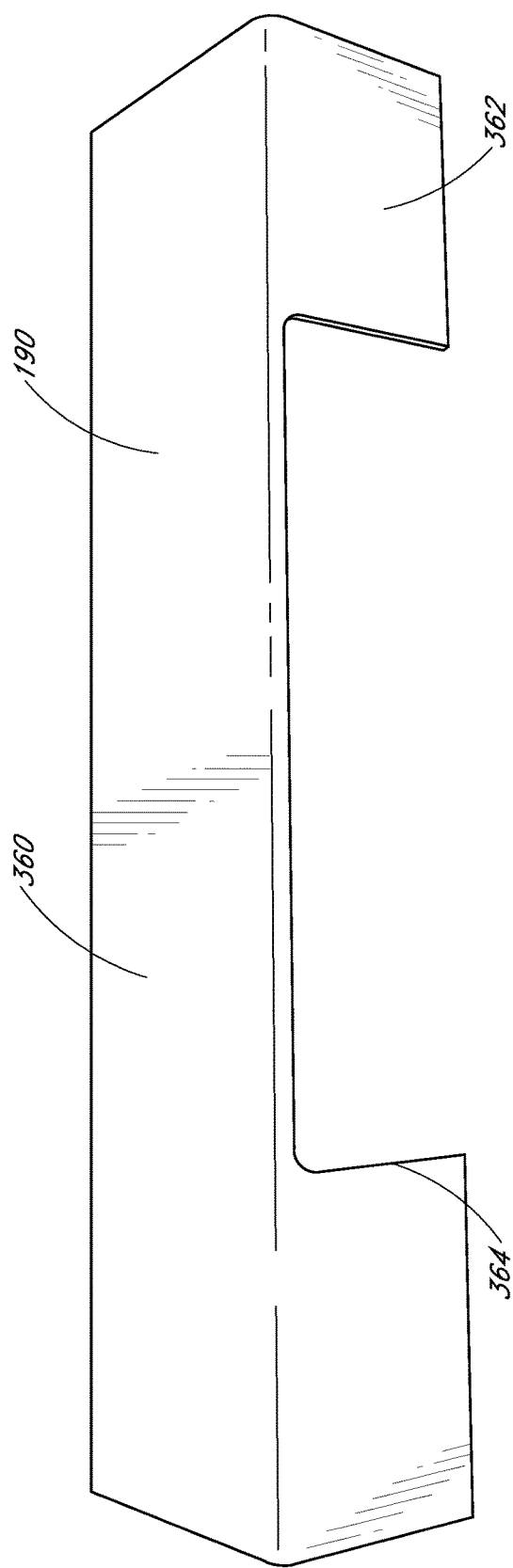
FIG. 14 shows a spacer for use in the safety cover.

With reference now to FIG. 14, an optional spacer 190 is shown. The optional spacer 190 is provided to help accommodate both standard sized cross arms 110, and other sized cross arms. When the device is placed on a standard sized cross arm 110, the spacer 190 provides a better fit by occupying unused internal space of the first housing section 104. Thus, the spacer 190 is not needed when the cross arm is of a larger size. In other words, the safety cover 100 can be sized for use with a large or oversized cross arm, called a heavy cross arm. Thus, when the same safety cover 100 is used for a standard sized cross arm, the spacer can be mounted to take up some of the open space 180 of the safety device. As shown, the spacer 190 comprises a main panel 360 and two side panels 362 (only one shown) extending from the main panel 360. Each side panel 360 has a cut-out 364 that allows one of the interior side panels 362 to rest on a cross arm and for the brackets 112 to clear the cut-out 364. In other words, the cross arm is placed in between the two side panels 362 and the brackets are positioned at the cut-out 364. The first and second housing sections 104, 106 are then placed over the spacer 190 and onto a utility pole, as discussed elsewhere herein.

Figure 15:
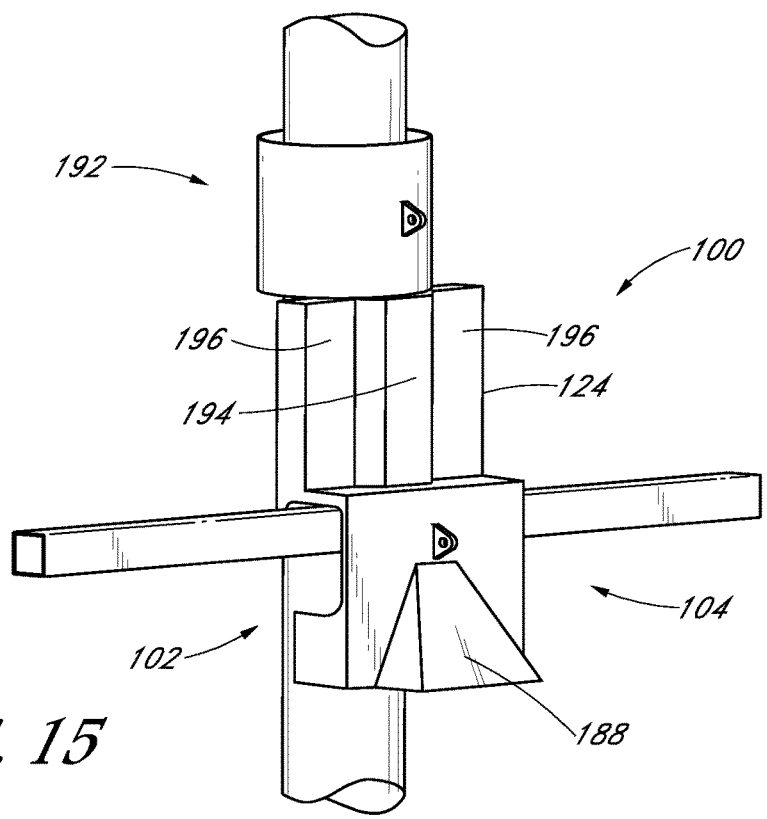
FIG. 15 shows an alternative embodiment of the safety cover.

FIG. 15 shows another embodiment of a safety cover 100 provided in accordance with aspects of the present disclosure. The present safety cover 100 has a two-piece design but not one that overlaps between the first and second sections of a utility pole, as previously defined and as described with reference to FIG. 4. Instead, a first housing section 104 is provided and is mounted onto a cross arm of a utility pole. A cylindrical sleeve element 192 is then placed over the first housing section. In one example, the first housing section 104 is generally the same as that discussed in previous embodiments, such as that shown in FIG. 5, except that the upper section 124 is elongated, a central three-sided section 194 is provided, and a pair of outer two-sided sections 196 are incorporated with the central section 194 to surround a portion of the utility pole 102. The cylindrical sleeve element 192 may be placed on top as shown, or hooked underneath of the first housing section 104 to cover conducting element attached to the utility pole 102.

The present embodiment may be used when a longer vertical section of the utility pole is to be covered. The cylindrical sleeve element 192 acts as an extension to lengthen the coverage space or area of the safety cover. As shown, the cylindrical sleeve element 192 rests on top of the upper section 124.

Figure 16:
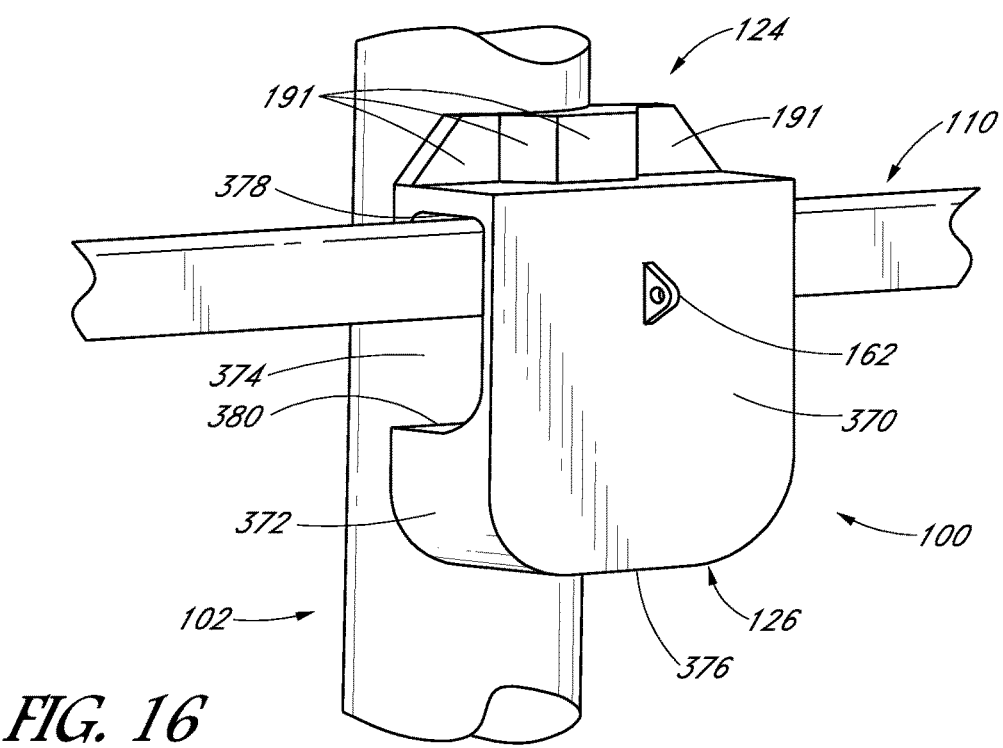
FIG. 16 shows an alternative embodiment of the safety cover.

FIG. 16 shows yet another embodiment of a safety cover 100 provided in accordance with aspects of the present disclosure. The present safety cover is a single piece design configured to cover the cross arm 110, the bracket (not shown), and part of the utility pole 102 where all three intersect without a second safety cover section or piece. The present safety cover 100 comprises an upper section 124 and a lower section 126. The upper section 124 comprises a plurality of panels 191 that partially surround the utility pole 102 and any portion of the bracket (not shown) attached to the utility pole above the cross arm 110. The lower section 126 comprises a central panel 370 having an eyelet mounted thereon and two side panels 372 each with a cut-out 374 that is sized and shape to be placed over a cross arm 110. The present safety cover 100 further comprises a bottom panel 376 that connects to the two side panels 372. The edge of the bottom panel 376 contacts the utility pole when the safety cover is mounted thereto. The upper edge 378 of the opening cutout 374 is configured to rest against the cross arm 110. An inner panel 380 may be incorporated and connects to the two side panels 372 and the bottom panel 376. When incorporated, the inner panel 380 is configured to rest against the utility pole.

Methods of making the safety covers disclosed herein are understood to be within the scope of the present disclosure.

Methods of using the safety covers disclosed herein are understood to be within the scope of the present disclosure.

Although limited embodiments of safety covers and their components have been specifically described and illustrated herein, many modifications and variations will be apparent to those skilled in the art. For example, the various safety covers may incorporate indicia, interchangeable sub-sections, different engagement means, and different non-conducting materials, etc. Furthermore, it is understood and contemplated that features specifically discussed for one safety cover embodiment may be adopted for inclusion with another safety cover embodiment provided the functions are compatible. For example, a top section may be used in another embodiment shown with reference to FIGS. 2-3. Accordingly, it is to be understood that the safety covers and their components constructed according to principles of the disclosed devices, systems, and methods may be embodied other than as specifically described herein. The disclosure is also defined in the following claims.

What is claimed is:
1. A safety cover for use with a utility pole comprising:
a housing having a plurality of panels forming a first vertical channel and a second horizontal channel intersecting one another at an intersection;
a first end opening into the second horizontal channel and a second end opening into the second horizontal channel located opposite the first end opening;
the first and second end openings being sufficiently large to accommodate a cross-arm of a utility pole and the vertical channel being sufficiently large to surround at least part of a circumference of a utility pole; and
wherein the housing is made of a rigid non-conducting material to electrically isolate electrical components covered by the housing.

2. The safety cover of claim 1, wherein the housing comprises a first housing piece and further comprising a second housing piece comprising a plurality of panels defining a horizontal channel.

3. The safety cover of claim 2, wherein the first and second housing pieces overlap on at least two surfaces.

4. The safety cover of claim 1, further comprising a slot in the housing for accommodating a support cable.

5. The safety cover of claim 1, further comprising a hood formed with the housing.

6. The safety cover of claim 3, wherein at least one of the overlaps occurs between two vertical surfaces.

7. The safety cover of claim 6, wherein at least one of the overlaps occurs between two horizontal surfaces.

8. The safety cover of claim 2, further comprising eyelets passing through slots to retain the first and second housing pieces together.

9. The safety cover of claim 8, further comprising locking pins made of a non-conducting material engaging the eyelets.

10. The safety cover of claim 1, further comprising a spacer sized and shaped to fit within the horizontal channel and wherein the spacer comprises a cut-out.

11. A safety cover for use with a utility pole comprising:
a first housing piece comprising an upper section and a lower section, which is wider than the upper section; the upper section comprising a plurality of panels defining a vertical channel for accommodating an elongated body of a utility pole and the lower section comprising a plurality of panels defining a horizontal channel for accommodating a cross-bar; a first side panel and a second side panel each comprising a cut-out defining an opening to the horizontal channel;
a second housing piece comprising an upper section and a lower section, which is wider than the upper section; the upper section comprising a plurality of panels defining a vertical channel for accommodating an elongated body of a utility pole and the lower section comprising a plurality of panels defining engaging arms for engaging the lower section of the first housing piece;
at least one eyelet located inside a slot for securing the first housing piece to the second housing piece; and
wherein both the first and second housing pieces are made from a rigid non-conducting material to electrically isolate electrical components covered by the first and second housing pieces.

12. The safety cover of claim 11, wherein the engaging arms of the second housing piece rest on a top panel of the first housing piece.

13. The safety cover of claim 11, wherein the first and second housing pieces overlap on at least two surfaces.

14. The safety cover of claim 11, further comprising a slot in the first housing piece having a support cable passing therethrough.

15. The safety cover of claim 11, further comprising a hood formed with the first housing piece.

16. The safety cover of claim 13, wherein at least one of the overlaps occurs between two vertical surfaces.

17. The safety cover of claim 16, wherein at least one of the overlaps occurs between two horizontal surfaces.

18. The safety cover of claim 12, further comprising a spacer sized and shaped to fit within the horizontal channel of the first housing piece and wherein the spacer comprises a cut-out.

19. The safety cover of claim 11, further comprising locking pins made of a non-conducting material that engage the eyelet.

20. A method for mounting a safety cover to a utility pole comprising:
providing a first housing piece made of a non-conducting material, said first housing piece comprising:
a plurality of panels defining a first channel sized and shaped to cover a cross arm of the utility pole;
a plurality of panels defining a second channel perpendicular to the first channel for covering at least part of a circumference of an elongated body of the utility pole;
placing the first housing piece onto the cross arm so that the cross arm is located at least in part inside the first channel; and
lowering the first housing piece so that the cross arm comes to rest in the first channel; and
wherein when the first housing piece comes to rest in the first channel, the first housing piece covers a bracket that connects the cross arm to the elongated body of the utility pole.

21. The method of claim 20, further comprising placing a second housing piece into engagement with the first housing piece.

* * * * *

UNITED STATES PATENT AND TRADEMARK OFFICE
CERTIFICATE OF CORRECTION

PATENT NO. : 9,912,135 B2
APPLICATION NO. : 14/488116
DATED : March 6, 2018
INVENTOR(S) : Daniel P. Rodriguez et al.

Page 1 of 1

It is certified that error appears in the above-identified patent and that said Letters Patent is hereby corrected as shown below:

In the Specification

In Column 10, Line 65, delete "(FIG. FIG. 1)" and insert -- (FIG. 1) --, therefor.

Signed and Sealed this
Fourteenth Day of May, 2019

Andrei Iancu
*Director of the United States Patent and Trademark Office*